3,053,896
PREPARATION OF p-NITRODIARYLAMINES
John P. Luvisi, Park Ridge, and Louis Schmerling, Riverside, Ill., assignors, by mesne assignments, to Universal Oil Products Company, Des Plaines, Ill., a corporation of Delaware
No Drawing. Filed Dec. 22, 1958, Ser. No. 781,877
8 Claims. (Cl. 260—576)

This invention relates to a process for the preparation of diaryl amino compounds by the reaction of amino aromatic compounds with chloro nitro aromatic compounds. More particularly, the present invention relates to the condensation of amino aromatic compounds with chloro nitro aromatic compounds in the presence of an aqueous reaction medium.

The object of the invention is a novel process for the preparation of diaryl amino compounds useful in themselves and as chemical intermediates. More specifically, an object is a process in which versatile intermediates such as p-nitrodiphenylamine may be produced by direct condensation methods from reactants which are relatively low in cost.

An economical and convenient method for the preparation of p-nitrodiphenylamine is highly desirable since its reductive alkylation with cyclohexanone yields N-phenyl-N'-cyclohexyl-p-phenylenediamine which is an antiozonant for rubber. In addition, p-nitrodiphenylamine has in itself desirable inhibitor characteristics in respect to gasolines.

The cheapest and possibly most convenient method would seem to be by direct condensation of aniline with p-nitrochlorobenzene. However, prior attempts to condense para-chloro aromatic compounds with amino aromatic compounds have met with a noted lack of success. In contrast, use of the process of the present invention results in high yields of desired condensation products with minimum loss of starting materials to undesirable side products.

One embodiment of this invention relates to a process which comprises reacting, in the presence of water, a chloro nitro aromatic compound with a compound selected from the group consisting of an amino aromatic compound and an acylated amino aromatic compound and recovering the desired reaction product.

A further embodiment of this invention relates to a process which comprises reacting, in the presence of water and a carboxylic acid, p-chloronitrobenzene with an amino aromatic compound at a reaction temperature in the range of from about 150° C. to about 300° C. and recovering the desired N-(p-nitrophenyl)-aryl amine.

A specific embodiment of this invention relates to a process which comprises reacting, in the presence of water and acetic acid, a molar excess of aniline with p-chloronitrobenzene at reaction temperatures in the range of from about 175° C. to 225° C. and recovering the desired p-nitrodiphenylamine.

Direct condensation of a chloro aromatic compound such as p-chloronitrobenzene, with an amino aromatic compound such as aniline, in the absence of water or an aqueous carboxylic acid media, gives an extremely low yield of the desired condensation product together with unidentifiable black tars and solids. By the addition of a water phase to the reaction zone a substantial increase in the yield of the condensation product is obtained as well as a notable decrease in the formation of black tars and solids. Also, proper control of the ratio of the water phase to the organic phase enhances the quality of the raw product. Further, it has been found that if the ratio by weight of the water phase to the organic phase is from about 1:1 to about 5:1 or more, high yields of desired product are obtained.

Still better results are achieved when the reaction takes place in an aqueous carboxylic acid medium. The addition of a carboxylic acid, such as acetic acid, to the aqueous reaction medium, aids in promoting a more desirable reaction by increasing the ultimate yields of condensation products and practically eliminating the formation of black tars and solids. Concentrations of the carboxylic acid ranging from about 1% to about 10% or more by weight of the water phase may be used with varying results.

Examples of utilizable carboxylic acid include such fatty acids as formic acid, acetic acid, propionic acid, butyric acid, valeric acid, caproic acid, isobutyric acid, isovaleric acid, etc. It is also contemplated within the scope of this invention that such carboxylic acids as oxalic acid, malonic acid, succinic acid, benzoic acid, o-toluic acid, m-toluic acid, p-toluic acid, phthalic acid, isophthalic acid, terephthalic acid, and phenylacetic acid, may be used in place of the above mentioned fatty acids but not necessarily with equivalent results.

The acid medium may be furnished by the use of acylated amino aromatic compounds such as acetanilide, with comparable results. In this manner the acylated amino aromatic compound will furnish the amino aromatic compound as well as the acid medium with the resultant decrease in the number of components in the reaction system.

Acylated amino aromatic compounds which may be used include formanilide, acetanilide, propionanilide, o-methylacetanilide, m-methylacetanilide, p-methylacetanilide, o-ethylacetanilide, m-ethylacetanilide, p-ethylacetanilide, o-propylacetanilide, m-propylacetanilide, p-propylacetanilide, o-isopropylacetanilide, m-isopropylacetanilide, p-isopropylacetanilide, o-butylacetanilide, m-butylacetanilide, p-butylacetanilide, o-sec-butylacetanilide, m-sec-butylacetanilide, p-sec-butylacetanilide, o-isobutylacetanilide, m-isobutyl acetanilide, p-isobutylacetanilide, o-tert-butylacetanilide, m-tert-butylacetanilide, p-tert-butylacetanilide, o-nitroacetanilide m-nitroacetanilide, p-nitroacetanilide, etc. These compounds have the general formula ArNHCOR in which Ar is an aromatic hydrocarbon radical and R is hydrogen or an alkyl group.

Product recovery and suppression of tar formation are further dependent upon the molar concentration of the amino aromatic compound with respect to that of the chloro nitro aromatic compound. In general, a molar excess of the amino aromatic compound is required. Yields improve with increase ratios within selected limits. The best results are obtained while operating within the molar range of about 5:1 to about 15:1.

Suitable utilizable amino aromatic compounds include aniline, o-toluidine, m-toluidine, p-toluidine, o-ethylaniline, m-ethylaniline, p-ethylaniline, o-propylaniline, m-propylaniline, p-propylaniline, o-isopropylaniline, m-isopropylaniline, p-isopropylaniline, o-butylaniline, m-butylaniline, p-butylaniline, o-sec-butylaniline, m-sec-butylaniline, p-sec-butylaniline, o-isobutylaniline, m-isobutylaniline, p-isobutylaniline, o-tert-butylaniline, m-tert-butylaniline, p-tert-butylaniline, o-nitroaniline, m-nitroaniline, p-nitroaniline, alpha-naphthylamine, beta-naphthylamine, etc. Mono-N-alkyl derivatives of these amines may also be used but not necessarily with equivalent results. In general, primary amino aromatic compounds having the general formula $ArNH_2$ are preferred, Ar being an aromatic hydrocarbon radical.

Examples of chloro nitro aromatic compounds which may be used include the three chloronitrobenzenes, 4-chloro-2-nitrotoluene, 5-chloro-2-nitrotoluene, 2-chloro-5-nitrotoluene, and other isomeric chloronitrotoluenes; 4-chloro-2-nitroethylbenzene, 5-chloro-2-nitroethylbenzene, 5-chloro-3-nitroethylbenzene, 4-chloro-2-nitropropylbenzene, and other chloronitroethylbenzenes; 5- chloro-2-nitropropylbenzene, 5 - chloro-3-nitropropylbenzene, etc.; 4-chloro-2-nitroisopropylbenzene, 5-chloro-2-nitroisopropylbenzene, 5-chloro-3-nitroisopropylbenzene, etc.; and other C-alkylated chloronitrobenzenes; 4-chloro-1 - nitronaphthalene, 2 - chloro-1-nitronaphthalene, and other chloronitronaphthalenes; and chloro nitro derivatives of other aromatic hydracarbons. The preferred chloro nitro compounds are those containing no functional groups other than chlorine and the nitro group and those in which the nitro group is in para position to the chlorine.

Reaction temperatures in the range of from about 150° C. to about 300° C., and preferably in the range of from about 175° C. to about 225° C., are the most desirable. Various contact times may be employed and primarily depend upon the reaction temperature and type of equipment used. In batch type experiments contact times may be varied from about one to about 24 hours. When operating within the preferred range of from about 175° C. to about 225° C., contact times of from about 12 to about 20 hours appear to give the best results.

Pressure does not appear to be an important variable in this process, except that superatmospheric pressure is preferred in order to maintain the reactants in the liquid phase. Thus, the reaction may be carried out at pressures ranging from about 1 to about 100 atmospheres or more. Under the proper conditions, autogeneous pressures are suitable.

When the process of this invention was carried out batchwise in a metal high pressure reactor, it was found initially that best results were obtained when the reactants were contained in a glass liner which minimized the inhibiting effect of the metal walls of the reactor on the reaction. Subsequently it was discovered that equally fine results could be achieved in metal equipment, without the use of a glass liner, by the addition of a suitable chelating agent such as a tetrasodium salt of ethylenediaminetetraacetic acid. Other suitable chelating agents include sequestering agents such as polyphosphates, the ethylenediaminetetraacetates, citric acid, carboxymethylmercaptosuccinic acid, certain Schiff bases of salicylaldehydes, etc.

The desired reaction product may be recovered from the crude product, consisting of two liquid layers, in any of the many well known manners, for example, the crude product may be ether extracted. The ether extracted product is separated from the aqueous phase and washed with diluted ammonium hydroxide followed by water washings until such washings give a neutral indication. The ether is removed from the washed product by means of vacuum distillation or any other suitable means.

The process of this invention may be effected in any suitable manner and may comprise either a batch or continuous type operation. When a batch type operation is used, the reactants are placed in a glass lined high pressure apparatus such as an autoclave. It is possible to charge the reactants directly to the autoclave as above set forth with the elimination of the glass liner. The autoclave is then heated to the desired reaction temperature. After a predetermined residence time has elapsed, the apparatus is allowed to cool to room temperature and the product is separated as described above, or in any conventional manner.

Where a continuous type operation is preferred, the amino aromatic compound and the chloro nitro aromatic compound are continually introduced into a suitable reactor in which the aqueous phase is maintained at a proper level, said reactor being maintained at proper reaction temperatures and pressures. The reactor may comprise an unlined vessel or coil. In the event a coil should be used, the aqueous medium may be introduced to the reactor continuously along with the chloro nitro aromatic compound and the amino aromatic compound. The starting material may be introduced into the reactor in single separate streams or may be commingled before introduction into the vessel and thus charged in a single stream. Product is continually withdrawn from the reactor and sent to a separator where the product layer is withdrawn and processed through the necessary washing medium. The unreacted materials can then be recycled back through the reactor with proper regulation.

The following examples are given to illustrate the process of this invention but are not intended to limit the generally broad scope of the present invention in strict accordance therewith.

*Example I*

This first example is given for reasons of comparison to better illustrate the inventive feature of this process.

In the absence of water or other aqueous media, 10 grams of p-nitrochlorobenzene and 60 grams of aniline were placed within a glass container which was in turn inserted in a rotating autoclave and sealed under 30 atmospheres of nitrogen. The autoclave was then rotated for a period of 4.5 hours during which time it was subjected to temperatures ranging from 200° C. to 210° C. The autoclave and its contents were then cooled to room temperature and the raw product recovered. Eight grams of intractable black solid and none of the desired product was obtained. No p-chloronitrobenzene was recovered.

*Example II*

This example illustrates the unexpected advantage of carrying out the reaction in the presence of water.

Ten grams of p-chloronitrobenzene, 60 grams of aniline, and 140 grams of distilled water were added to a glass container and inserted in a rotating autoclave and sealed under 30 atmospheres of nitrogen. The autoclave was then rotated for a period of 16 hours during which time the temperature was maintained at about 200° C. and the pressure averaged about 60 atmospheres.

The autoclave and its contents were allowed to cool to room temperature, and the crude product, which consisted of two liquid layers, was ether extracted. The ether layer was separated from the aqueous layer and washed with dilute ammonium hydroxide followed by water washings. The ether was then removed by means of a steam bath and the product was subjected to vacuum distillation. 7.3 grams of crystalline p-nitrodiphenylamine melting at about 133–138° C. was recovered in addition to 4 grams of black solids. No p-chloronitrobenzene was recovered.

*Example III*

This example shows the advantage of carrying out the reaction in the presence of an aqueous solution of a carboxylic acid.

Ten grams of p-chloronitrobenzene, 60 grams of aniline, 6 grams of acetic acid, and 140 grams of distilled water were added to a glass container and inserted in a rotating autoclave and sealed under 30 atmospheres of nitrogen. The autoclave was then rotated for a period of 16 hours during which time the temperature was maintained at about 200° C. and the pressure averaged about 70 atmospheres.

The autoclave and its contents were allowed to cool to room temperature and the crude product was treated as above described. 8.8 grams of crystalline p-nitrodiphenylamine melting at about 133–138° C. were recovered in addition to only 0.7 gram of black solids. There was recovered 3 grams of unreacted p-chloronitrobenzene.

*Example IV*

Sixteen grams of p-chloronitrobenzene, 30 grams of acetanilide, and 140 grams of distilled water were added to a glass container and inserted in a rotating autoclave and sealed under 30 atmospheres of nitrogen. The autoclave was then rotated for a period of 16 hours during which time the temperature was maintained at about 200° C. and the pressure averaged about 60 atmospheres.

The autoclave and its contents were allowed to cool to room temperature and the crude product was treated as above described. 5.8 grams of crystalline p-nitrodiphenylamine was recovered in addition to 10 grams of unreacted p-chloronitrobenzene. There were no black solids.

*Example V*

Ten grams of p-chloronitrobenzene, 60 grams of aniline, 5 grams of formic acid, and 140 grams of distilled water were added to a glass container and inserted in a rotating autoclave and sealed under 30 atmospheres of nitrogen. The autoclave was then rotated for a period of 16 hours during which time the temperature was maintained at about 200° C. and the pressure averaged about 60 atmospheres.

The autoclave and its contents were allowed to cool to room temperature and the crude product was treated as above described. 12.8 grams of crystalline p-nitrodiphenylamine melting at about 133–138° C. was recovered in addition to 4 grams of black solids and 2.5 grams of unreacted p-chloronitrobenzene.

*Example VI*

Ten grams of p-chloronitrobenzene, 60 grams of aniline, 13 grams of acetanilide, and 140 grams of distilled water were added to a glass container and inserted in a rotating autoclave and sealed under 30 atmospheres of nitrogen. The autoclave was then rotated for a period of 16 hours during wihch time the temperature was maintained at about 200° C. and the pressure averaged about 60 atmospheres.

The autoclave and its contents were allowed to cool to room temperature and the crude product was treated as above described. 8.5 grams of crystalline p-nitrodiphenylamine melting at about 133–138° C. was recovered in addition to 1.5 grams of black solids and 4 grams of unreacted p-chloronitrobenzene.

*Example VII*

Ten grams of p-chloronitrobenzene, 100 grams of 1-naphthylamine and 220 grams of distilled water are added to a glass container and inserted in a rotating autoclave and sealed under 30 atmospheres of nitrogen. The autoclave is then rotated for a period of 16 hours during which time the temperature is maintained at about 200° C.

The autoclave and its contents is allowed to cool to room temperature and the crude product treated as above described. A substantial yield of N-(p-nitrophenyl)-1-naphthylamine is recovered.

*Example VIII*

Ten grams of p-chloronitrobenzene, 70 grams of p-toluidine and 160 grams of distilled water are added to a glass container and inserted in a rotating autoclave and sealed under 30 atmospheres of nitrogen. The autoclave is then rotated for a period of 16 hours during which time the temperature is maintained at about 200° C. The autoclave and its contents are allowed to cool to room temperature and the crude product treated as above described. A substantial yield of 4-methyl-4'-nitrodiphenylamine is recovered.

*Example IX*

Examples IX and X are given to illustrate the effectiveness of metal deactivators when a glass liner is omitted.

Forty-one grams of p-chloronitrobenzene and 242 grams of aniline and 540 grams of distilled water were added directly to an Aminco rocking type autoclave and sealed under 30 atmospheres of nitrogen. The autoclave was then rotated for a period of 16 hours during which time the temperature was maintained at about 200° C. The autoclave and its contents were allowed to cool to room temperature and 36 grams of an intractable black solid were recovered. Only 2 g. of p-nitrodiphenylamine was obtained.

*Example X*

Forty-one grams of p-chloronitrobenzene and 242 grams of aniline and 560 grams of water and 4 grams of the tetrasodium salt of ethylenediaminetetraacetic acid were added directly to an Aminco rocking type autoclave and sealed under 30 atmospheres of nitrogen. The autoclave was then rotated for a period of 8 hours during which time the temperature was maintained at about 200° C. The autoclave and its contents were allowed to cool to room temperature and the crude product, which consisted of two liquid layers was ether extracted. The ether layer was separated from the aqueous layer and washed with dilute ammonium hydroxide followed by water washings. The ether was then removed by means of a steam bath and the product was subjected to vacuum distillation. 21.5 grams of crystalline p-nitrodiphenylamine melting at about 133–138° C. was recovered in addition to only 9 grams of black solids.

We claim as our invention:

1. A process for the preparation of p-nitrodiphenylamine which comprises reacting aniline with p-chloronitrobenzene at a reaction temperature in the range of from about 175° C. to about 225° C. in the presence of sufficient water to provide a weight ratio of water phase to organic phase of from about 1:1 to about 5:1, and recovering the resultant p-nitrodiphenylamine.

2. A process for the preparation of p-nitrodiphenylamine which comprises reacting aniline with p-chloronitrobenzene at a reaction temperature in the range of from about 175° C. to about 225° C. in the presence of a solution of acetic acid and sufficient water to provide a weight ratio of water phase to organic phase of from about 1:1 to about 5:1, and recovering the desired p-nitrodiphenylamine.

3. A process for the preparation of 4-methyl-4'-nitrodiphenylamine which comprises reacting p-toluidine with p-chloronitrobenzene at a reaction temperature in the range of from about 175° C. to about 225° C. in the presence of a solution of acetic acid and sufficient water to provide a weight ratio of water phase to organic phase of from about 1:1 to about 5:1, and recovering the desired 4-methyl-4'-nitrodiphenylamine.

4. A process for the preparation of N-(p-nitrophenyl)-1-naphthylamine which comprises reacting 1-naphthylamine with p-chloronitrobenzene at a reaction temperature in the range of from about 175° C. to about 225° C. in the presence of a solution of acetic acid in sufficient water to provide a weight ratio of water phase to organic phase of from about 1:1 to about 5:1, and recovering the desired N-(p-nitrophenyl)-1-naphthylamine.

5. A process for the preparation of p-nitrodiphenylamine which comprises reacting acetanilide with p-chloronitrobenzene at a reaction temperature in the range of from about 175° C. to about 225° C. in the presence of sufficient water to provide a weight ratio of water phase to organic phase of from about 1:1 to about 5:1, and recovering the desired p-nitrodiphenylamine.

6. A process for the preparation of p-nitrodiphenylamine which comprises reacting aniline with p-chloronitrobenzene at a reaction temperature in the range of from about 175° C. to about 225° C. in the presence of sufficient water to provide a weight ratio of water phase to organic phase of from about 1:1 to about 5:1, and ethylenediaminetetraacetic acid, and recovering the desired p-nitrodiphenylamine.

7. A process which comprises reacting p-chloronitrobenzene, in the presence of water and at a temperature of from about 150° C. to about 300° C., with an amino aromatic compound selected from the group consisting of $ArNH_2$ and $ArNHCOR$ in which Ar is an aromatic hydrocarbon radical and R is selected from the group consisting of hydrogen and alkyl, the amount of water being sufficient to provide a weight ratio of water phase to organic phase of from about 1:1 to about 5:1.

8. A process which comprises reacting p-chloronitrobenzene, in the presence of water and a fatty acid containing up to 6 carbon atoms and at a temperature of from about 150° C. to about 300° C., with an amino aromatic compound selected from the group consisting of $ArNH_2$ and ArNHCOR in which Ar is an aromatic hydrocarbon radical and R is selected from the group consisting of hydrogen and alkyl, the amount of water being sufficient to provide a weight ratio of water phase to organic phase of from about 1:1 to about 5:1.

References Cited in the file of this patent

UNITED STATES PATENTS

| | | |
|---|---|---|
| 1,309,580 | Marshall | July 8, 1919 |
| 1,401,631 | Moran | Dec. 27, 1921 |
| 2,476,170 | Widiger | July 12, 1949 |
| 2,700,060 | Cherlow et al. | Jan. 8, 1955 |
| 2,924,620 | Miller | Feb. 9, 1960 |

FOREIGN PATENTS

| | | |
|---|---|---|
| 1,946 | Great Britain | 1907 |
| 428,618 | Great Britain | May 16, 1935 |